United States Patent [19]

Cheballah

[11] Patent Number: 6,101,820
[45] Date of Patent: Aug. 15, 2000

[54] METHOD AND DEVICE FOR DIAGNOSING AN AIR-CONDITIONING LOOP OF A MOTOR VEHICLE

[75] Inventor: Amar Cheballah, Epiny sur Seine, France

[73] Assignee: Chausson Service, Saint Ouen l'Aumone, France

[21] Appl. No.: 09/213,461

[22] Filed: Dec. 17, 1998

[30] Foreign Application Priority Data

Dec. 17, 1997 [FR] France .................................. 97 16021

[51] Int. Cl.[7] .................................................. F25B 49/02

[52] U.S. Cl. .............................................. 62/127; 62/129

[58] Field of Search .............................. 62/125, 126, 127, 62/129, 130; 340/585, 607; 364/557, 558, 509

[56] References Cited

U.S. PATENT DOCUMENTS

| | | | |
|---|---|---|---|
| 5,214,918 | 6/1993 | Oguni et al. | 62/129 X |
| 5,239,865 | 8/1993 | Salzer et al. | 62/129 X |
| 5,381,669 | 1/1995 | Bahel et al. | 62/129 |
| 5,560,213 | 10/1996 | Wieszt | 62/125 |
| 5,627,770 | 5/1997 | Barbier et al. | 62/127 X |
| 5,647,222 | 7/1997 | Sarakinis | 62/129 |

*Primary Examiner*—Harry B. Tanner
*Attorney, Agent, or Firm*—Morgan & Finnegan, L.L.P.

[57] ABSTRACT

In a method of diagnosing an air-conditioning loop of a motor vehicle an undercooling value is determined from parameters of the loop. An overheating value is determined from parameters of the loop. The undercooling value is compared with minimal and maximal values. The overheating value is compared with minimal and maximal values. The comparison results are processed to provide information about the operational status of the loop.

19 Claims, 2 Drawing Sheets

METHOD AND DEVICE FOR DIAGNOSING AN AIR-CONDITIONING LOOP OF A MOTOR VEHICLE

FIELD OF THE INVENTION

The invention concerns a method and device for diagnosing an air-conditioning loop of the passenger compartment of a motor vehicle.

BACKGROUND OF THE INVENTION

A loop of the above kind conventionally comprises a compressor, a condenser, a desiccant cartridge, an expansion unit and an evaporator through which a cooling fluid flows in the above order. A flow of air to be directed to the passenger compartment flows through the evaporator.

The operational status of the air-conditioning loop of the motor vehicle must be checked, in particular during periodic servicing.

There are various possible causes of malfunctioning of the loop and it is essential to be able to identify them in order to correct them.

One prior art diagnostic device measures the pressure of the cooling fluid at the outlet from the compressor (high pressure side) and the prevailing temperature in the passenger compartment under reproducible conditions.

However, the above prior art device can establish only an outline diagnosis without full identification of the nature and the origin of the malfunction that has been noted.

DISCUSSION OF THE INVENTION

One aim of the invention is to overcome this drawback.

To this end it proposes a diagnostic method of the type defined in the introduction which comprises the following operations:

a1) determining an undercooling value from parameters of the loop;

a2) determining an overheating value from parameters of the loop;

b1) comparing the undercooling value from operation a1) with minimal and maximal values;

b2) comparing the overheating value from operation a2) with minimal and maximal values; and processing the results of the comparison operations b1) and b2) to produce information on the functional status of the loop.

The diagnosis of the operation of the air-conditioning loop is therefore established on the basis of an undercooling value and an overheating value which are determined from parameters of the loop. The undercooling and overheating values are compared each time with minimal and maximal values to provide information on the operational status of the loop.

In a preferred embodiment of the invention the method further comprises the following operations:

a3) determining a temperature value of the flow of air from the evaporator under given operating conditions; and b3) comparing said temperature value from operation a3) with minimal and maximal values;

and operation c) includes processing the results of the comparison operation b3).

The method therefore also measures the temperature of the flow of air from the evaporator, i.e. the flow of cooled air entering the passenger compartment.

The flow of air whose temperature is measured can come from the evaporator directly or indirectly.

The temperature can be measured either directly at the output from the evaporator or preferably at the air exit into the passenger compartment.

In accordance with another feature of the invention operation a1) includes measuring a high pressure value at the outlet from the condenser and measuring a temperature value at the entry of the expansion unit.

Operation a1) advantageously includes calculating the undercooling value as the difference between the temperature value at the entry to the expansion unit and the theoretical value of the saturation temperature corresponding to the measured high pressure value.

In accordance with a further feature of the invention operation a2) includes measuring a low pressure value at the exit from the expansion unit and measuring a temperature value at the intake of the compressor. Operation a2) advantageously includes calculating the overheating value as the difference between the temperature value at the intake of the compressor and the theoretical value of the saturation temperature corresponding to the measured low pressure value.

Operation c) advantageously provides an indication of one of the following:

correct operation of the loop if the undercooling value is between minimal and maximal values and if the overheating value is between minimal and maximal values;

insufficient cooling fluid if the undercooling value is low or zero and/or if the overheating value is high;

excess cooling fluid if the overheating value is low or zero and/or if the undercooling value is high; or clogging of the desiccant cartridge if the overheating value is correct and if the undercooling value is high.

In accordance with another feature of the invention the minimal and maximal values of the undercooling value are respectively 2° C. and 8° C. and the minimal and maximal values of the overheating value are respectively 2° C. and 8° C.

When the method includes measuring the temperature of the flow of air operation c) further provides one of the following indications of the performance of the loop:

correct operation if the temperature of the flow of air is between minimal and maximal values; or malfunction if the temperature of the flow of air is below the minimal value or above the maximal value.

The minimal and maximal values of the temperature of the flow of air are advantageously 2° C. and 10° C., respectively.

The method of the invention can further include an operation of selecting the type of cooling fluid flowing in the air-conditioning loop.

Another aspect of the invention concerns a diagnostic device applicable to implementing the above method and which comprises:

means for determining an undercooling value from parameters of the loop;

means for determining an overheating value from parameters of the loop;

comparator means for comparing the undercooling value with minimal and maximal values;

comparator means for comparing the overheating value with minimal and maximal values; and means for processing results provided by the comparator means to provide information as to the operational status of the loop.

In a preferred embodiment of the invention the device further comprises means for determining a temperature value of the flow of air from the evaporator under given operating conditions and means for comparing the temperature value with minimal and maximal values and the processing means are further adapted to process the results produced by the comparator means.

In a preferred embodiment of the invention the device comprises means for supplying one of the following indications:

correct operation of the loop;

insufficient cooling fluid;

excess cooling fluid;

desiccant cartridge clogged; or malfunction.

The following description, which is given by way of example only, refers to the accompanying drawings.

DESCRIPTION OF PREFERRED EMBODIMENTS OF THE INVENTION

Figure 1:
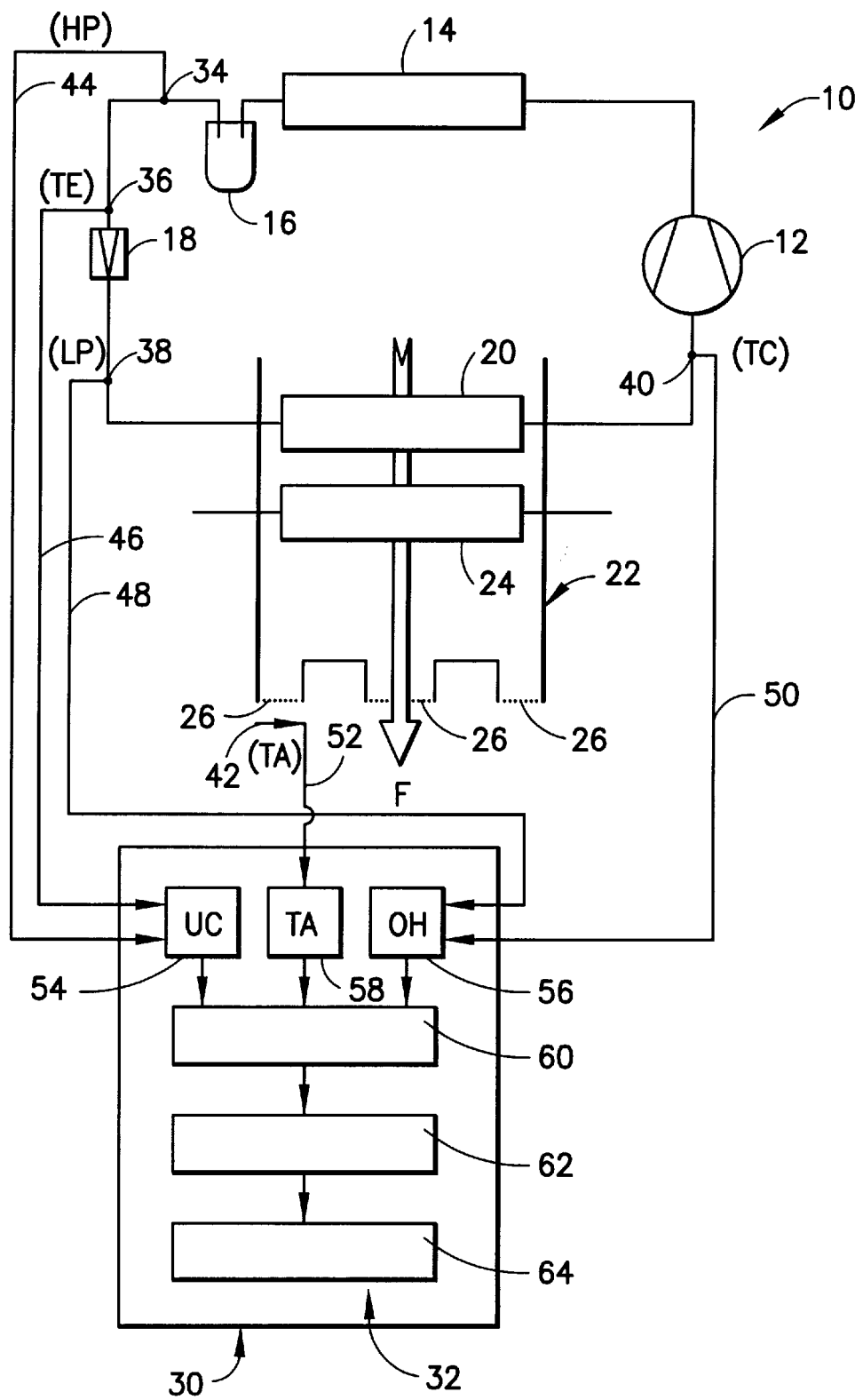
FIG. 1 is a diagram showing a diagnostic device in accordance with the invention connected to a motor vehicle air-conditioning loop.

Refer firstly to FIG. 1 which shows an air-conditioning loop 10 that is part of a motor vehicle installation. The loop 10 comprises a compressor 12, a condenser 14, a desiccant cartridge 16, an expansion unit 18 and an evaporator 20 through which a cooling fluid flows in that order.

The evaporator 20 is housed in a unit 22 that also contains a heating radiator 24 so that a flow of air (arrow F) can pass in succession through the evaporator 20 and the heating radiator 24 and thence into the passenger compartment of the vehicle through air exits 26.

In an air-conditioning loop of the above type the gaseous cooling fluid is compressed by the compressor 12 and passed to the condenser 14 in which it is converted to the liquid phase. The liquid cooling fluid then passes through the desiccant cartridge 16 in which it is filtered and dehydrated. The liquid cooling fluid is then expanded in the expansion unit 18 and passed to the evaporator 20 in which it is converted to the gas phase, cooling the flow of air F.

To diagnose the operation of the loop 10 the invention provides a diagnostic device 30 including a calculator unit 32 adapted to be connected to various sensors to measure various parameters.

The sensors comprise a sensor 34 for measuring a high pressure value HP at the exit from the condenser 14, a sensor 36 for measuring a temperature value TE at the entry of the expansion unit 18, a sensor 38 for measuring a low pressure value LP at the exit from the expansion unit 18 and a sensor 40 for measuring a temperature value TC at the intake of the compressor 12.

A sensor 42 is also provided to measure a temperature value TA of the cooled flow of air coming out of the air exits 26, the measurement being carried out under controlled conditions.

The aforementioned sensors 34, 36, 38, 40 and 42 are connected to the unit 32 by respective lines 44, 46, 48, 50 and 52.

The lines 44 and 46 are connected to means 54 for determining an undercooling value UC which include a table embodying a law of variation in the saturation temperature TS of the cooling fluid as a function of the high pressure.

The means 54 calculate the undercooling value UC in the form of a temperature difference $\ddot{A}T=TE-TS\text{-}HP$ where TS-HP is the theoretical value of the saturation temperature for the measured high pressure HP.

The lines 48 and 50 are connected to means 56 for determining an overheating value OH representative of the operation of the loop. The means 56 include a table embodying a law of variation in the saturation temperature as a function of the low pressure.

The means 56 therefore calculate the value OH as a temperature difference $\ddot{A}T=TC-TS\text{-}LP$ where TS-LP is the theoretical value of the saturation temperature for the measured low pressure LP.

The line 52 is connected to means 58 for determining the temperature TA of the flow of air coming out of the air exits.

The aforementioned determination means 54, 56 and 58 are connected to comparator means (comparator) 60 which process the information from the means 54, 56 and 58.

The comparator means 60 compare the value UC to respective minimal and maximum values UC min and UC max. In this example these two values are respectively 2° C. and 8° C.

The comparator means 60 also compare the value OH to respective minimal and maximal values OH min and OH max. In this example these two values are respectively 2° C. and 8° C.

The comparator means 60 also compare the measured value TA with respective minimal and maximal values TA min and TA max. In this example these two values are respectively 2° C. and 10° C.

The comparator means 60 are connected to processing means 62 which process the information using predefined algorithms and display the results on indicator means 64.

To this end the device 30 preferably includes a microprocessor incorporating algorithms for calculating the overheating and undercooling values and for interpreting measured thermodynamic values.

The processing means 62 provide one of the following diagnoses:

correct operation of the loop if UC is between UC min and UC max and if OH is between OH min and OH max;

insufficient cooling fluid if UC is low or zero (UC≦UC min) and/or if OH is high (OH≧OH max);

excess cooling fluid if OH is low or zero (OH≦OH min) and/or if UC is high (UC≧UC max); or clogging of said desiccant cartridge if OH is correct (UC min≦UC≦UC max) and if UC is high (UC≧UC max).

The processing unit 62 can also provide one of the following indicators as to the performance of the loop:

correct operation if TA is between TA min and TA max; or malfunction if TA≦TA min or≧TA max.

The diagnostic is produced under defined and therefore reproducible conditions. These conditions are for example:

vehicle engine running at 1 500 rpm;

maximum pulser speed ("max" position);

air inlet unit set to "outside air" position;

air-conditioning set to lowest temperature ("max cold" position);

air exits closed except for that at which the temperature "TA" of the flow of air is sensed;

vehicle doors and windows closed.

Figure 2:
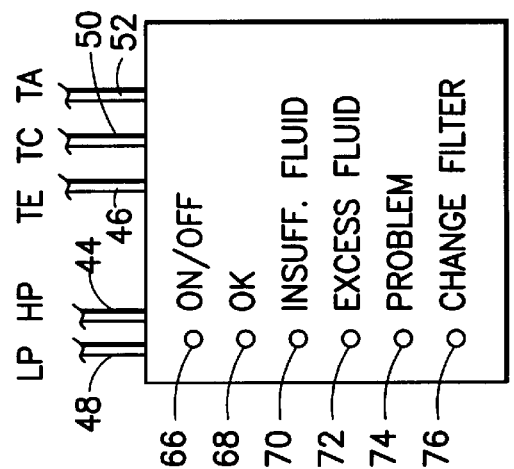
FIG. 2 shows the casing of a device constituting one embodiment of the invention with indicator means.

FIG. 2 shows a casing of the device which can be connected to the vehicle installation by the lines 44, 46, 35 48, 50 and 52 described previously.

The casing comprises an ON/OFF button and five indicator lamps: correct operation ("OK") indicator 68, "INSUFFICIENT FLUID" indicator 70, "EXCESS FLUID" indicator 72, "PROBLEM" (malfunction) indicator 74 and "CHANGE FILTER" (cartridge clogged) indicator 76. The indicators are advantageously light-emitting diodes.

Figure 3:
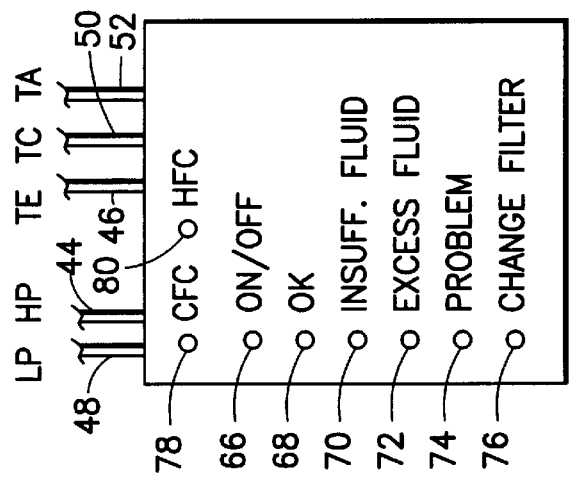

In the FIG. 3 embodiment the casing further includes two buttons 78 and 80 for selecting the type of cooling fluid used in the air-conditioning loop being diagnosed. In this example either of the following cooling fluids can be selected: "CFC" (chlorofluorocarbon) and "HFC" (hydrofluorocarbon).

Figure 4:
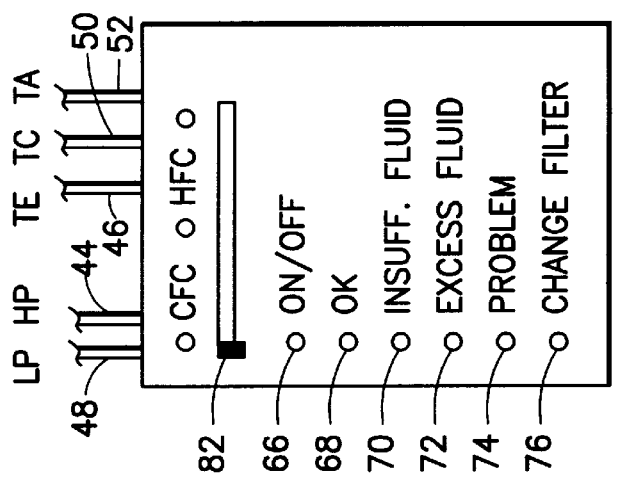
FIGS. 3 and 4 show two casings constituting two other embodiments of the invention.

In the FIG. 4 embodiment the casing has a cursor 82 for selecting one of three types of cooling fluid: "CFC", "HFC" and a third that is not identified.

The device includes appropriate connections for connecting it to the loop. It can establish a complete diagnosis of the operation of the loop with a view to correcting any malfunction.

Of course, the invention is not limited to the embodiments previously described by way of example and encompasses other embodiments.

There is claimed:

1. A method of diagnosing an air-conditioning loop of a motor vehicle passenger compartment, said loop comprising a compressor, a condenser, a desiccant cartridge, an expansion unit and an evaporator through which a cooling fluid flows in the above order, a flow of air to be directed into the passenger compartment flowing through said evaporator, the method comprises the steps of:

a1) determining an undercooling value from parameters of the loop;

a2) determining an overheating value from parameters of the loop;

b1) comparing the undercooling value from operation a1) with predetermined minimal and maximal undercooling values;

b2) comparing the overheating value from operation a1) with predetermined minimal and maximal overheating values; and c) processing the results of the comparison operations b1) and b2) to produce information on the functional status of the loop.

2. A method according to claim 1 further including the following steps of:

a3) determining a temperature value of the flow of air from the evaporator under given operating conditions; and b3) comparing said temperature value from operation a3) with predetermined minimal and maximal temperature values, wherein step c) includes processing the results of the comparison step b3).

3. A method according to claim 2 wherein said temper of said flow of air is measured directly at the exit from said evaporator.

4. A method according to claim 2 wherein said temperature of said flow of air is measured directly at an air exit.

5. A method according to claim 1 wherein step a1) includes measuring a high pressure value at the exit of said condenser and measuring a temperature value at the entry of said expansion unit.

6. A method according to claim 5 wherein step a1) includes calculating said undercooling value as a difference between said temperature value at said entry of said expansion unit and a theoretical saturation temperature value corresponding to the measured high pressure value.

7. A method according to claim 1 wherein step a2) includes measuring a low pressure value at said exit of said expansion unit and measuring a temperature value at the intake of said compressor.

8. A method according to claim 7 wherein step a2) includes calculating said overheating value as a difference between said temperature value at said intake of said compressor and a theoretical saturation temperature value corresponding to the measured low pressure value.

9. A method according to claim 1 wherein step c) provides one of the following indications:

correct operation of said loop if said undercooling value is between the predetermined minimal and maximal undercooling values and if said overheating value is between the predetermined minimal and maximal overheating values;

insufficient cooling fluid if said undercooling value is low or zero and/or if said overheating value is high;

excess cooling fluid if said overheating value is low or zero and/or if said undercooling value is high; or clogging of said desiccant cartridge if said overheating value is correct and if said undercooling value is high.

10. A method according to claim 9 wherein said predetermined minimal and maximal undercooling values are respectively 2° C. and 8° C.

11. A method according to claim 9 wherein said predetermined minimal and maximal overheating values are respectively 2° C. and 8° C.

12. A method according to claim 2 wherein step c) further provides one of the following indications of loop performance:

correct operation if said temperature of said flow of air is between said predetermined minimal and maximal temperature values; or malfunction if said temperature of said flow of air is below said predetermined minimal value or above said predetermined maximal temperature value.

13. A method according to claim 12 wherein said predetermined minimal and maximal temperature values are respectively 2° C. and 10° C.

14. A method according to claim 1 further comprising the step of selecting a type of cooling fluid that is being used in said air-conditioning loop.

15. A method according to claim 1 wherein step c) provides one of the following indications:

correct operation of said loop if said undercooling value is between the predetermined minimal and maximal undercooling values if said overheating value is between the predetermined minimal and maximal overheating values;

insufficient cooling fluid if said undercooling value is less than or substantially equivalent to the predetermined minimal undercooling value and/or if said overheating value is higher than or substantially equivalent to the predetermined maximal overheating value;

excess cooling fluid if said overheating value is lower than or substantially equivalent to the predetermined minimal overheating value and/or if said undercooling value is higher than substantially equivalent to the predetermined maximal undercooling value; or clogging of said desiccant cartridge if said overheating value is between the predetermined minimal and maximal undercooling values and if said undercooling value is higher than or substantially equivalent to the predetermined maximal undercooling value.

16. A diagnostic device for implementing the method according to claim 1 comprising:

means for determining an undercooling value from parameters of said loop;

means for determining an overheating value from parameters of said loop;

first comparator means for comparing said undercooling value with the predetermined minimal and maximal undercooling values;

second comparator means for comparing said overheating value with the predetermined minimal and maximal overheating values;

processing means for processing the results provided by said first and second comparator means to provide information as to the operational status of said loop.

17. A device according to claim 16 further including:

means for determining a temperature value of the flow of air from said evaporator under given operating conditions; and third comparator means for comparing said temperature value with the predetermined minimal and maximal temperature values wherein said processing means are adapted to process results from said third comparator means 18. A device according to claim 17 including indicator means adapted to provide one of the following indications:

correct operation of said loop;

insufficient cooling fluid;

excess cooling fluid;

desiccant cartridge clogged; or malfunction.

19. The device according to claim 16, wherein said processing means is a microprocessor.

* * * * *